US009682706B2

(12) United States Patent
Fairgrieve et al.

(10) Patent No.: US 9,682,706 B2
(45) Date of Patent: Jun. 20, 2017

(54) SYSTEM AND METHOD FOR CONTROLLING THE SPEED OF A VEHICLE

(71) Applicant: Jaguar Land Rover Limited, Whitley, Coventry, Warwickshire (GB)

(72) Inventors: Andrew Fairgrieve, Rugby (GB); Daniel Woolliscroft, Birmingham (GB); James Kelly, Solihull (GB); Mark Stanton, Felsted (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 64 days.

(21) Appl. No.: 14/421,867

(22) PCT Filed: Aug. 13, 2013

(86) PCT No.: PCT/EP2013/066908
§ 371 (c)(1),
(2) Date: Feb. 16, 2015

(87) PCT Pub. No.: WO2014/026987
PCT Pub. Date: Feb. 20, 2014

(65) Prior Publication Data
US 2015/0191169 A1    Jul. 9, 2015

(30) Foreign Application Priority Data

Aug. 16, 2012  (GB) .................................. 1214651.0
Mar. 15, 2013  (GB) .................................. 1304670.1

(51) Int. Cl.
*B60T 8/32*       (2006.01)
*G05D 1/00*      (2006.01)
(Continued)

(52) U.S. Cl.
CPC ........... *B60W 30/143* (2013.01); *B60K 28/16* (2013.01); *B60K 31/02* (2013.01); *B60K 31/04* (2013.01);
(Continued)

(58) Field of Classification Search
CPC ......... B60W 30/143; B60W 2720/106; B60W 30/16; B60W 10/06; B60K 31/047; B60K 31/0008
(Continued)

(56) References Cited

U.S. PATENT DOCUMENTS

2005/0131614 A1   6/2005  Isogai et al.
2012/0136548 A1   5/2012  Hoff
2012/0197501 A1*  8/2012  Sujan ..................... B60K 23/00
                                                                      701/51

FOREIGN PATENT DOCUMENTS

DE    10335731 A1    2/2005
GB     2417335 A      2/2006
(Continued)

OTHER PUBLICATIONS

International Search Report for application No. PCT/EP2013/066908, dated Oct. 21, 2013, 3 pages.
(Continued)

*Primary Examiner* — Maceeh Anwari
(74) *Attorney, Agent, or Firm* — Reising Ethington P.C.

(57) ABSTRACT

A method for controlling the speed of vehicle is provided. The method comprises providing a memory device configured to store a plurality of predefined set-speeds therein. The method further comprises selecting a desired set-speed from the plurality of predefined set-speeds stored in the memory device. The method may further comprise determining whether the selected set-speed is appropriate based on one or more conditions. The method may still further comprise
(Continued)

causing the vehicle to operate in accordance with the selected set-speed when it is determined that the set-speed is appropriate. A system comprising a memory device configured to store a plurality of predefined set-speeds, and electronic control unit configured to select a desired one of the predefined set-speeds stored in the memory is also provided.

18 Claims, 6 Drawing Sheets

(51) Int. Cl.
| | | |
|---|---|---|
| *G06F 7/00* | (2006.01) | |
| *G06F 17/00* | (2006.01) | |
| *B60W 30/14* | (2006.01) | |
| *B60K 28/16* | (2006.01) | |
| *B60K 31/02* | (2006.01) | |
| *B60K 31/04* | (2006.01) | |
| *B60T 8/175* | (2006.01) | |
| *F16H 61/02* | (2006.01) | |
| *F16H 59/66* | (2006.01) | |
| *B60W 50/00* | (2006.01) | |

(52) U.S. Cl.
CPC .......... *B60T 8/175* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2050/0071* (2013.01); *B60W 2550/141* (2013.01); *B60Y 2200/20* (2013.01); *F16H 59/66* (2013.01); *F16H 2061/0234* (2013.01)

(58) Field of Classification Search
USPC .......................................................... 701/93
See application file for complete search history.

(56) References Cited

FOREIGN PATENT DOCUMENTS

| | | |
|---|---|---|
| JP | 61033326 | 2/1986 |
| WO | 2008082403 A1 | 7/2008 |
| WO | 2012088537 A1 | 6/2012 |

OTHER PUBLICATIONS

UK Combined Search and Examination Report for corresponding application No. GB1304670.1, dated Sep. 11, 2014, 5 pages.
Written Opinion for application No. PCT/EP2013/066908, dated Oct. 21, 2013, 5 pages.

* cited by examiner

US 9,682,706 B2

SYSTEM AND METHOD FOR CONTROLLING THE SPEED OF A VEHICLE

TECHNICAL FIELD

The present disclosure relates generally to vehicle speed control, and more particularly, to a method and system for controlling the speed of a vehicle capable of traversing a variety of different terrains and conditions.

BACKGROUND

In known vehicle speed control systems, typically referred to as cruise control systems, a set-speed for the vehicle may be initially set by manually bringing the vehicle up to the desired speed, and then manipulating a user-selectable user interface device, such as, for example, by manipulating (e.g., pressing) a pushbutton to set that speed as the set-speed. When the user wants to change the set-speed thereafter, the same or different user input device(s) may be manipulated to increase or decrease the set-speed.

While very simple in nature and easy to perform, the above-described process for adjusting the set-speed during operation of the cruise control system is not without its drawbacks. For example, when the set-speed is adjusted either up or down (i.e., increased or decreased), the adjustment must be performed in discrete and predetermined equal increments, typically, increments of 1 mph (or 1 kph, for example, for vehicles with speed displayed in metric units). As a result, if the new set-speed that the user wishes to change to is more than the amount of the predetermined increment, the user must either press the appropriate button multiple times or hold down the button for an extended period of time to pass through all of the intervening speeds between the current and new set-speeds before ultimately reaching the desired new set-speed. This task may prove burdensome, let alone distracting, to the user who in most instances would be driving the vehicle while also adjusting the set-speed.

Accordingly, there is a need for a speed control system and method for use with the same that minimizes and/or eliminates one or more of the above-identified deficiencies.

SUMMARY

According to one embodiment, there is provided a method of controlling the speed of a vehicle. The method comprises: providing a memory device configured to store a plurality of predefined set-speeds therein; selecting a desired set-speed from the plurality of predefined set-speeds stored in the memory device; and causing the vehicle to operate in accordance with the selected set-speed.

According to another embodiment, there is provided a method of controlling the speed of a vehicle. The method comprises: providing a memory device configured to store a plurality of predefined set-speeds therein; evaluating one or more conditions relating to the vehicle to determine which of the plurality of predefined set-speeds are appropriate in view of the evaluated condition(s); selecting a desired set-speed only from those of the plurality of predefined set-speeds that are determined to be appropriate; and causing the vehicle to operate in accordance with the selected set-speed.

According to a further embodiment, there is provided a system for controlling the speed of a vehicle. The system comprises a memory device configured to store a plurality of predefined set-speeds therein, and an electronic control unit. The electronic control unit is configured to select a desired set-speed from the plurality of predefined set-speeds stored in the memory device, and to cause the vehicle to operate in accordance with the selected set-speed.

DESCRIPTION OF THE DRAWINGS

One or more embodiments of the invention will now be described, by way of example only, with reference to the following figures in which.

DETAILED DESCRIPTION

The method and system described herein may be used to control the speed of a vehicle. In one embodiment, the present method and system select a desired set-speed from a plurality of predefined set speeds that are stored in a memory device, and then cause the vehicle to operate in accordance with the selected set-speed.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present disclosure.

Figure 1:
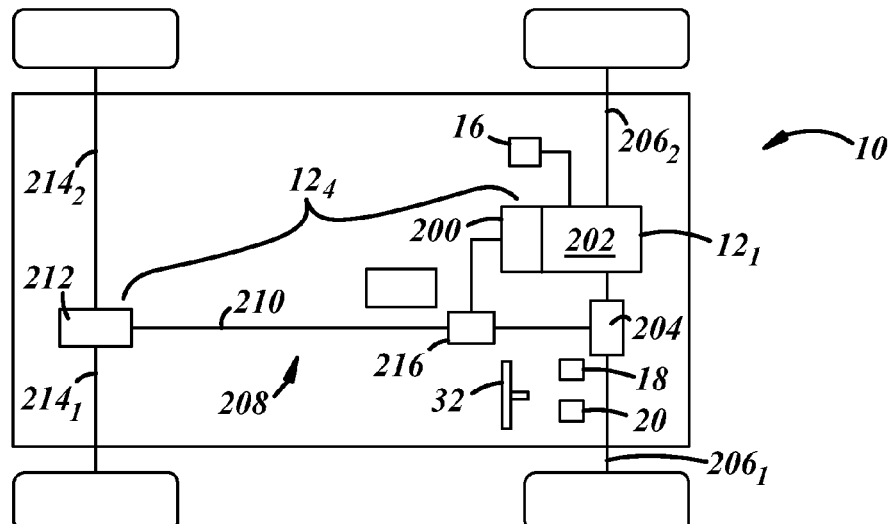
FIG. 1 is schematic and block diagrams of a vehicle.
Figure 2:
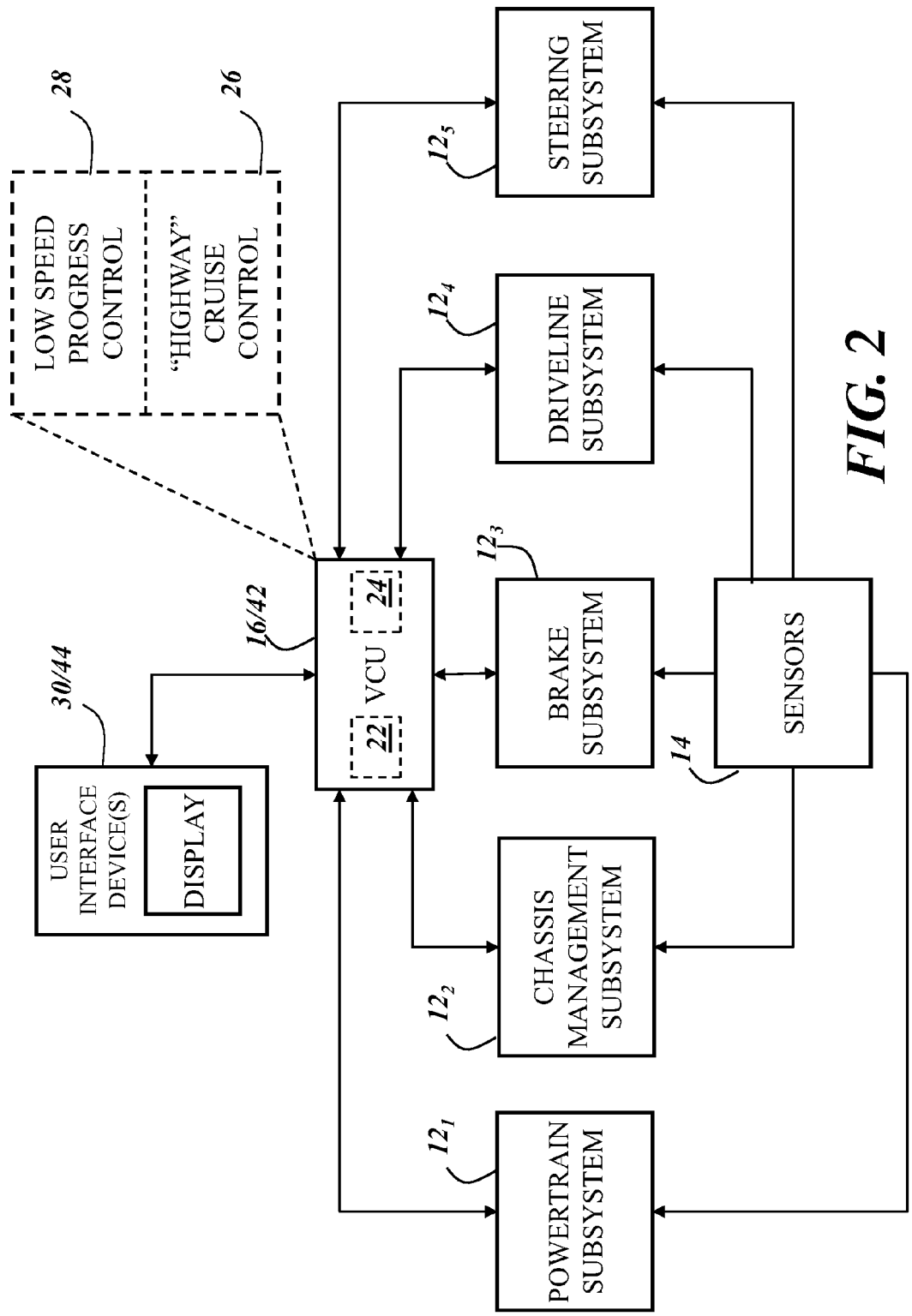
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2. It will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 18 (VCU 16), among any number of other components, systems, and/or devices not illustrated or otherwise described herein.

Subsystems 12 of vehicle 10 may be configured to perform or control various functions and operations relating to the vehicle and, as illustrated in FIG. 2, may include any number of subsystems. One such subsystem is a powertrain subsystem $12_1$. As is well known in the art, powertrain subsystem $12_1$ is configured to generate power or torque that is used to propel the vehicle. The amount of torque generated by the powertrain subsystem may also foe adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities, in one embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means and may be used for a variety of purposes by one or more components, modules, or subsystems of vehicle 10, in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. Accordingly, the present disclosure is not limited to any one particular powertrain subsystem.

Vehicle 10 may also include a chassis control or management subsystem $12_2$. Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name, only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described, or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or other information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using and air compressor (suspension compressor) onboard the vehicle. Chassis management subsystem $12_2$ may further be configured to monitor the attitude of the vehicle. More particularly, subsystem $12_2$ may receive readings or information from one or more of sensors 14 and/or subsystems 12 described or identified herein to evaluate the pitch, roll, and yaw of the vehicle, and therefore, the overall attitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_2$ may be configured to control and/or monitor any number of other or additional parameters/aspects of vehicle 10 in the same or similar manner as that described above. As such, the present disclosure is not limited to the control and/or monitoring of any particular parameters/aspects. Moreover, it will be further appreciated that chassis management subsystem $12_2$ may be provided according to any number of different embodiments and may include any number of different components, like sensors, control units, and/or any other suitable components known in the art. Accordingly, the present disclosure is not limited to any one particular chassis management subsystem Yet another example of subsystem of vehicle 10 is a driveline subsystem $12_4$. As is known in the art, and as is illustrated in FIG. 1, driveline system $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer box 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present disclosure is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this disclosure, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In any event, in one embodiment, one or more of subsystems 12 may be under at least a certain degree of control by VCU 16. In such an embodiment those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem 12₁ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem 12₁ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem 12₁, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present disclosure.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to the operation and configuration of vehicle 10, and may include, for example and without limitation, any one or more of: wheel speed sensors; ambient temperature sensors; atmospheric pressure sensors; tyre pressure sensors; gyro sensors to detect yaw, roll, and pitch of the vehicle; vehicle speed sensors; a longitudinal acceleration sensor; an engine torque sensor; a driveline torque sensor; a throttle valve sensor; a steering angle sensor; a steering wheel speed sensors; a gradient sensor; a lateral acceleration sensor on the stability control system (SCS); a brake pedal position sensor; brake pedal pressure sensor; an accelerator pedal position sensor; air suspension sensors (i.e., ride height sensors); wheel position sensors; water detection sensors (for both proximity and depth of wading events); a transfer case HI-LO ratio sensor; an air intake path sensor; and longitudinal, lateral, and vertical motion sensors, among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc, of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s), but rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment VCU 16 includes an electronic memory device 22 that may store various information, sensor readings (e.g., such as those generated by vehicle sensors 14), look-up tables or other data structures, algorithms (e.g., the algorithms embodied in the method described below), etc. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above. In one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem 12₁), or for example, VCU 16 (as is illustrated in FIG. 2).

Figure 3:
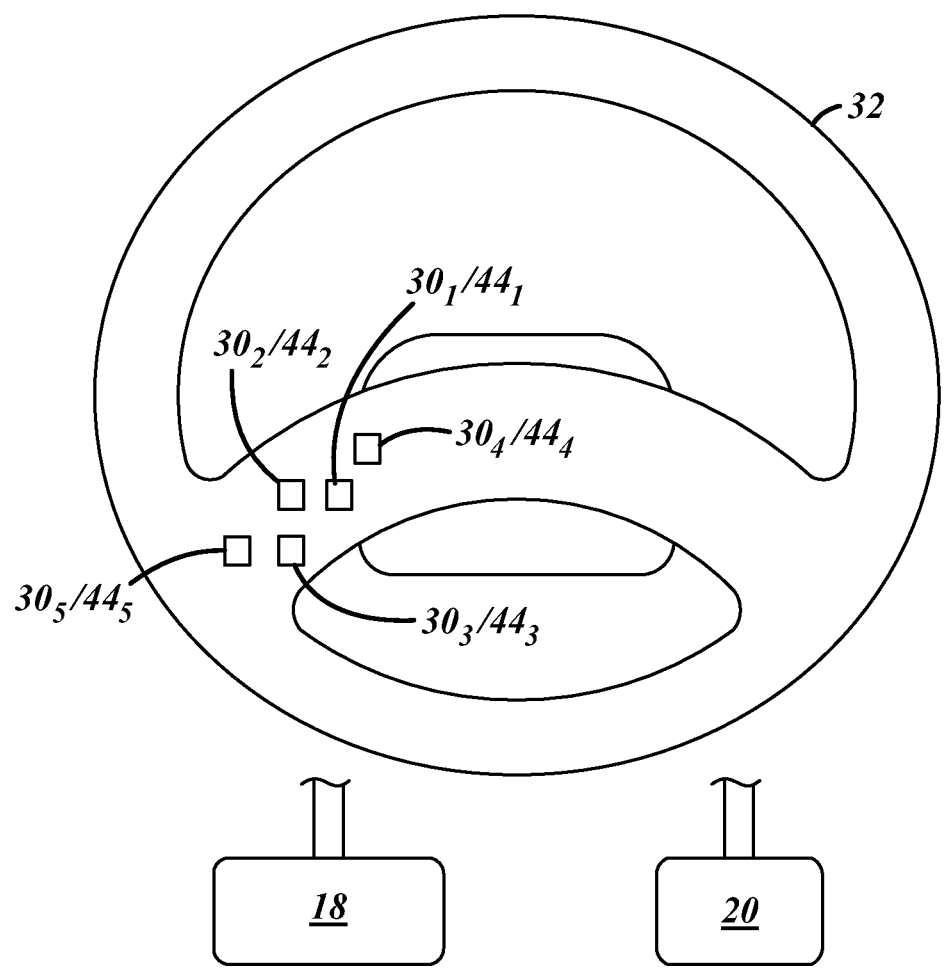
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button 30₁ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button 30₂ may be provided to allow the user to increase the set-speed in discrete increments (e.g., 1 mph (or 1 kph)), and a "−" button 30₃ to allow the user to decrease the set-speed in the same discrete increments. Alternatively, the "+" and "−" buttons 30₂, 30₃ may be integrated into a single user-selectable device. Additional user-selectable interface devices of system 26 may include, for example, a "cancel" button 30₄ to deactivate or suspend the system, as well as a "resume" button 30₅ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling, the cruise control function. LSP control system 28 may also differ from such cruise control systems in that, in at least one embodiment, if is configured in such a way that the speed control function provided thereby is not cancelled or deactivated in response to those events described above.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: determining characteristics of the terrain over which vehicle 10 is traveling; selecting a desired set-speed for system 28 from a plurality of predefined set-speeds; determining whether a particular set-speed is appropriate for vehicle 10 and/or whether vehicle 10 is appropriately configured for a particular set-speed; etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 26, respectively, are arranged adjacent to one another within vehicle 10, and, in one embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc. of vehicle 10.

Figure 4:
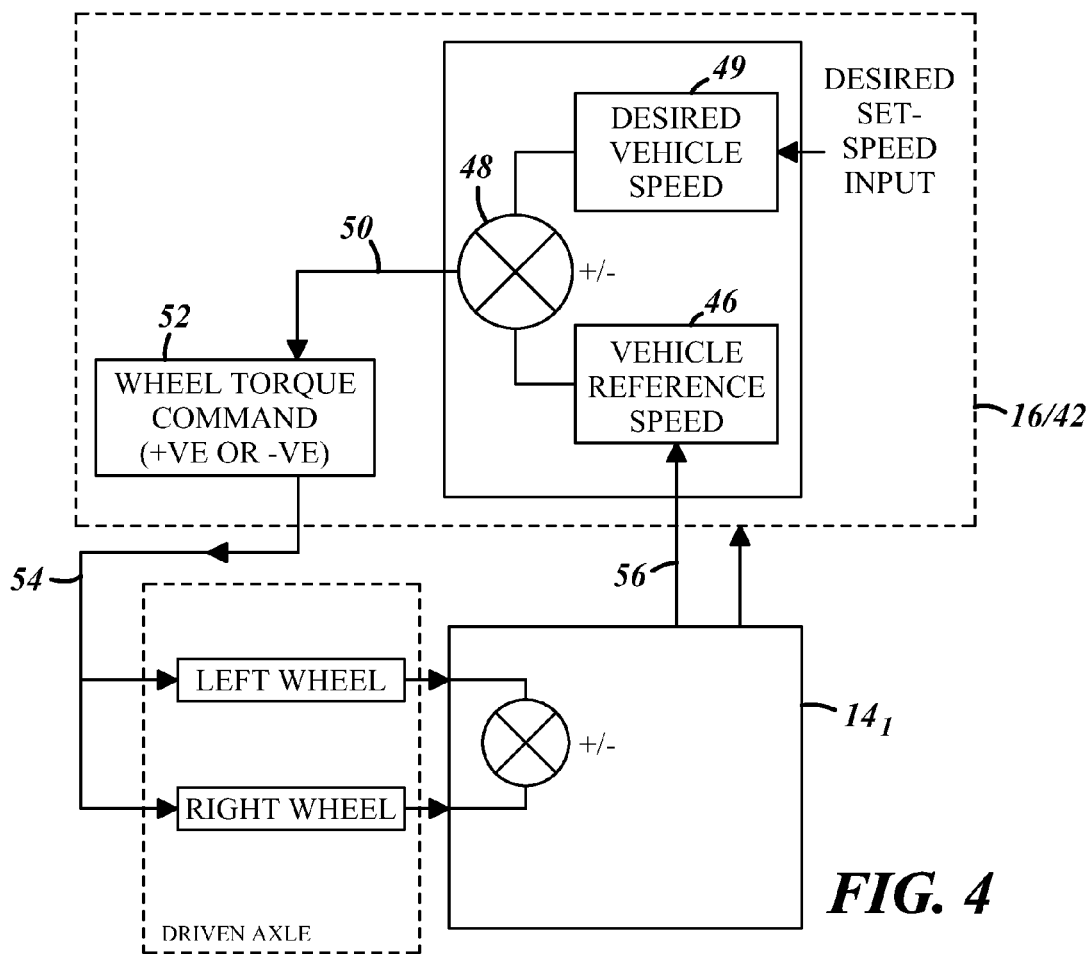
FIG. 4 is a schematic and block diagram illustrating the operation of an example of a speed control system of a vehicle, such as the vehicle illustrated in FIGS. 1 and 2.

More particularly, and with reference to FIG. 4, once the desired set-speed is determined, a vehicle speed sensor (identified as sensor $14_1$ in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. In certain instances, VCU 16 may also receive a signal 58 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any one particular embodiment or arrangement.

Again, the preceding description of vehicle 10 and the illustrations in FIGS. 1 and 2 are only intended to illustrate one potential vehicle arrangement and do so in a general way. Any number of other vehicle arrangements and architectures, including those that differ significantly from the one shown in FIGS. 1 and 2, may be used instead.

Figure 5:
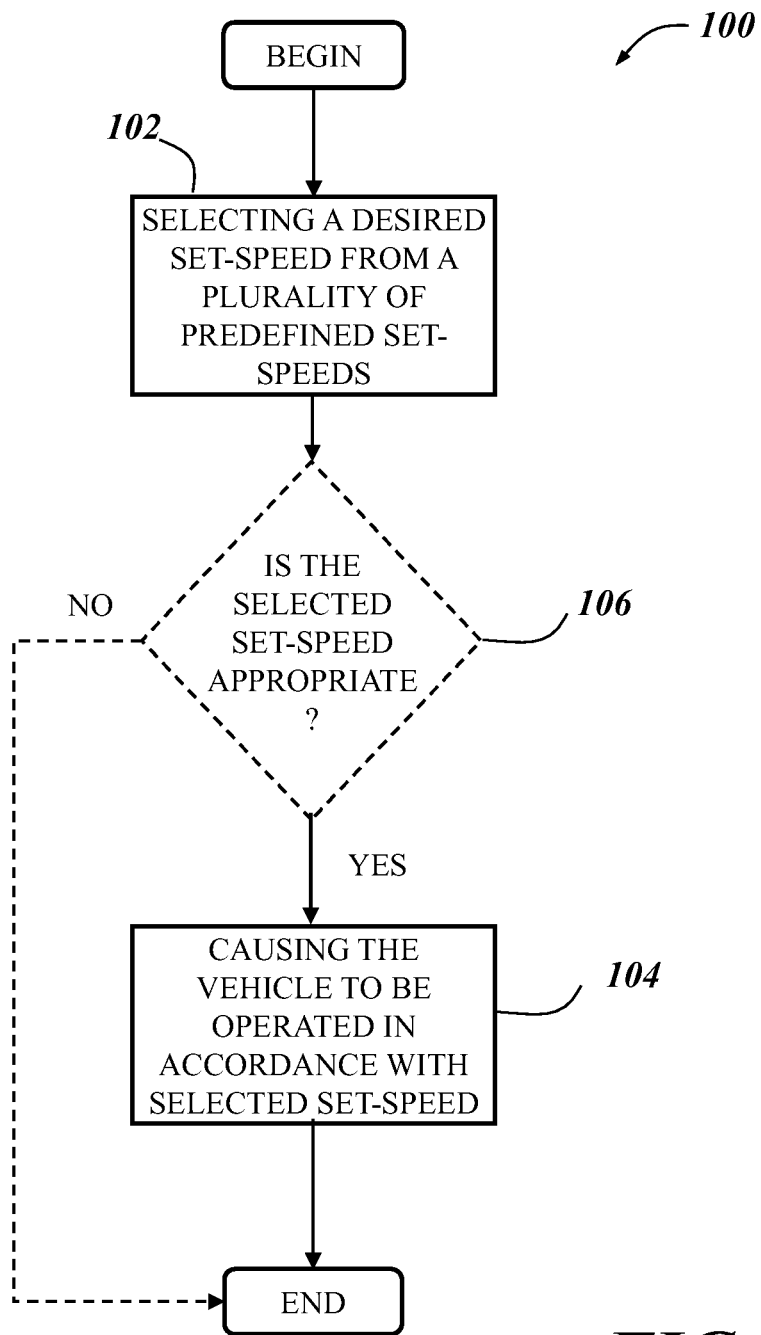
FIGS. 5-7 are flows diagram of alternate embodiments of a method for controlling the speed of a vehicle, such as the vehicle illustrated in FIGS. 1 and 2.

Turning new to FIG. 5, there is shown an example of a method 100 for controlling the speed of a vehicle. For purposes of illustration and clarity, method 100 will be described in the context of vehicle 10 illustrated in FIGS. 1 and 2 and described above, and more specifically, the low-speed progress (LSP) control system 28 thereof, in particular (which, in an embodiment, is integrated in VCU 16 (i.e., VCU 16 comprises ECU 42 of speed control system 28). It will be appreciated, however, that the application of the present methodology is not meant to be limited solely to such an arrangement, but rather method 100 may find application with any number of other speed control system arrangements, including, for example, LSP control systems other than that described above (e.g., not integrated into the VCU of a vehicle, and/or the VCU does not comprise the ECU of the speed control system), as well as, in certain instances, conventional "on-highway" cruise control systems, such as, for example, cruise control system 26 described above. Accordingly, the present disclosure is not meant to be limited to any one particular arrangement or type of speed control system. Additionally, it will be appreciated that the performance of method 100 is not meant to be limited to any one particular order or sequence of steps.

As an initial matter, method 100 comprises a first step (not shown) of providing a memory device configured to store a plurality of predefined set-speeds. This memory device may be any type of suitable memory device, and in accordance with one embodiment, comprises memory device 22 of VCU 16, or another suitable memory device of, or accessibly by, VCU 16, and processing device 24 thereof, in particular. The individual set-speeds that make up the plurality of predefined set-speeds may be derived in one or a combination of ways.

In one example, set-speeds may be defined during manufacture of the vehicle and stored in memory device 22 or another suitable component in one such embodiment, the predefined set-speeds may correspond specifically to the vehicle or type of vehicle on which they are stored (e.g., the set-speeds are specifically tailored to the vehicle/type of vehicle). Additionally, or in the alternative, each predefined set-speed may correspond to, or be associated with, one or more particular types or natures of terrain over which the vehicle may travel (e.g., sand, snow, water, boulders, mud, grass, etc.). In another embodiment, the set-speeds may be unrelated or not specific to either one or both of the particular vehicle or type of terrain, rather they may simply be general set-speeds. In any event, in one embodiment, some or all of the plurality of predefined set-speeds may be pre-set during manufacture and prior to a customer receiving the vehicle.

In another example, some or all of the predefined set-speeds may be defined during operation of the vehicle. This may be done in a number of ways. One way is that a user or driver may be permitted to manually define set-speeds using, for example, one or more user interface devices. More particularly, the user may know particular speeds be wants to program into the speed control system for a particular journey (or in general), and he may do so by manipulating any suitable and appropriately configured user interface device in a predetermined or prescribed way. In accordance with one embodiment, one or more user interface devices 44 may be appropriately configured to allow the user to define one or more set-speeds. For example, set-speeds may be defined by manipulating one or a combination of user input devices $40_1$-$40_5$ in a particular or prescribed manner that will indicate to VCU 16 that the user wishes to define a set-speed and what that set-speed is (e.g., manipulating a particular device and/or in a particular way (e.g., pressing a button a certain number of times, for a particular length of time, or in accordance with a particular pattern), manipulating a combination of devices in a particular order or in a particular way, etc). Alternatively, a user input device in the form of a touch screen or display device configured to display one or more user-inputtable or user-selectable fields may be used. Accordingly, it will be appreciated that the present disclosure is not meant to be limited to any one particular technique.

A user may also be able to define set-speeds while the vehicle is moving or traveling. For instance, if, as the vehicle is traveling, the user finds a speed he likes, he may define that speed as a set-speed. As with the example above, this may be done by manipulating one or more user interface devices, such as those described above, thereby indicating that the current speed should be saved as a set-speed. For example. In one embodiment, when the vehicle reaches a speed the user likes, he may manipulate one or more user interfaces 44, and/or may do so in a particular way (e.g., manipulating a particular device and/or in a particular way (e.g., pressing a button a certain number of times, for a particular length of time, or in accordance with a particular pattern), manipulating a combination of devices in a particular order or in a particular way, etc.) to indicate to VCU 16 that the user wishes to define the current speed as a set-speed. In response, the speed control system (e.g., VCU 16) is configured to read the current speed and define and save it as set-speed. Alternatively, in certain instances, the vehicle may be configured to allow the user to define a set-speed in ways other than using user input devices of the speed control system. For example, set-speeds may be defined by manipulating one or both of the accelerator and brake pedals of the vehicle in the same or similar manner as that described in detail in GB Patent Application GB1214651.0, filed 16 Aug. 2012, the entire contents of which are incorporated by reference. To summarize, however, the vehicle may be configured such that a set-speed may be defined by a light tapping or pressing of the accelerator and/or brake pedal in a way that will not actuate the vehicle brakes. In such an embodiment, the speed control system (e.g., VCU 16) is configured to monitor pedal input signals from the accelerator and brake pedals (e.g., pedals 18, 20), and if the amount of pedal travel meets a predetermined threshold distance or is within a prescribed range of travel, or alternatively, if the amount of pressure applied to the pedal meets certain threshold or is within a prescribed range, the speed control system is configured to read the current speed and define and save it as set-speed. Accordingly, in view of the above, if will be appreciated that any number of techniques, including but not limited to, those described above, may be used to allow a user to define one or more set-speeds, and the present disclosure is not limited to any particular one.

In addition to or instead of those ways described above, in one embodiment, set-speeds may also be automatically defined by the speed control system itself. One way in which this may be done is that each time the set-speed of the vehicle is adjusted (i.e., the user requests that the set-speed be incrementally adjusted (e.g., 1 mph or 1 kph increments)), the speed control system may define and save it as a set-speed. Accordingly, if a vehicle is traveling at 5 mph (approximately 8 kph) and the driver adjusts the speed to 7 mph (approximately 11 kph), the control system will save 5 mph (8 kph) as a predefined set-speed, and may also set the new speed (7 mph (11 kph)) as another set-speed. An additional or alternative way in which set-speeds may be automatically defined is that when the vehicle travels at a given speed for a prescribed of amount of time or distance without adjustment, the system may save that speed as a set-speed. Accordingly, in view of the above, it will be appreciated that any number of techniques, including but not limited to, those described above, may be used to automatically define set-speeds, and the present disclosure is net limited to any particular technique.

Regardless of whether the set-speeds are defined manually by a user, automatically by the speed control system, or both, one or more of the predefined set-speeds may be associated with one or more types of information. One type of information, but certainly not the only type, relates to terrain. More specifically, in some embodiments, and as with the pre-set predefined set-speeds described above, some or all of the set-speeds may be associated with the terrain over which the vehicle was traveling when the set-speed was defined. In such an embodiment, each time a set-speed is defined, the type or nature of the corresponding terrain and, in certain instances, additional characteristics relating thereto (e.g., roughness), is determined. That information is then associated and stored along with the particular set-speed to which it corresponds. The information relating to the terrain may be determined in a number of ways. One way is that the speed control system (e.g., VCU 16) may acquire it from another subsystem or component of the vehicle. For example, each time a set-speed is defined, VCU 16 may query the appropriate subsystem 12 to acquire the appropriate terrain information. Another way is that the speed control system may be configured to detect, sense, or otherwise determine the terrain-related information itself.

For example, and in accordance with one embodiment, VCU 16, or another suitable component, may be configured to determine various types of information regarding the terrain over which the vehicle is traveling (e.g., terrain type, surface classification, terrain roughness, etc.), and may do so in a number of ways. One such way is that described in UK Published Patent Application No. GB2492748A published on 10 Jan. 2013, the entire contents of which are incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type and, in certain instances, one or more characteristics thereof, such as, for example, the roughness of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is travelling over rocky terrain), aerodynamic drag, yaw, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface). The SCS activity signal is derived from several outputs from the ECU of a SCS, which contains a dynamic stability control (DSC) function, a traction control (TC) function, anti-lock brake system (ABS) and hill descent control (HDC) algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module also uses the outputs from wheel speed sensors and in a four wheel vehicle, compares output across each axle and from front to rear on each side, to determine a wheel speed variation and corrugation detection signal.

In some embodiments, and in addition to the estimator module, a road roughness module may also be included for calculating the terrain roughness based on air suspension sensors (the ride height sensors) and wheel accelerometers. In such an embodiment, a terrain indicator signal in the form of a roughness output signal is output from the road roughness module.

In any event the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes is most appropriate based on the indicators of the type of terrain over which the vehicle is traveling, and to then automatically control the appropriate subsystems 12 accordingly.

One advantage of associating predefined set-speeds with information such as, for example, that related to terrain and/or various characteristics thereof, is that it is possible to create subsets or groups of set-speeds that may be used to limit the universe of speeds from which, as will be described below, a selection may be made in order to more precisely control the speed of the vehicle to attempt to optimize or enhance vehicle composure and/or occupant comfort. Another benefit that will be described below is that it may also permit a determination to be made as to whether a set-speed selected during method 100 is appropriate in view of the prevailing terrain.

Accordingly, in one embodiment, method 100 may comprise a step (not shown) of defining one or more set-speeds during operation of the vehicle and storing that or those set-speeds in a data structure of a memory device, such as, for example, memory 22 of VCU 16.

With reference to FIG. 5, method 100 comprises a step 102 of selecting, when the speed control system is in an active state, a desired set-speed from a plurality of predefined set-speeds stored in the memory device (e.g., memory device 22 of VCU 16). This step may be performed to select an initial set-speed when the system is activated or re-activated following a suspension in its functionality, or during operation of the system to change from a current set-speed to a new set-speed, and may be performed in a number ways. In one embodiment, step 102 comprises receiving a user input corresponding to the desired set-speed, in such an embodiment, and similar to the techniques described above with respect to the defining of set-speeds, the user may select a desired set-speed from the plurality of predefined set-speeds, or a particular subset thereof, using a user interface device. An electrical signal representing the user's selection is then received and used by the speed control system (e.g., VCU 16) to determine the desired set-speed.

For instance, each of the plurality of set-speeds from which the user may make a selection may correspond to a corresponding user interface device 44. For example, in an instance herein there are three (3) predefined set-speeds, one set-speed (e.g., 10 mph (approximately 16 kph)) may be assigned or correspond to "+" pushbutton $44_2$, another (e.g., 6 mph (approximately 9 kph)) may be assigned or correspond to "−" pushbutton $44_3$, and the third (e.g., 3 mph (approximately 5 kph)) may be assigned or correspond to "resume" pushbutton $44_5$. Accordingly, the user may select the desired set-speed by manipulating the appropriate user interface device in a prescribed way (e.g., one or more presses). It will be appreciated that pushbuttons may be augmented by or replaced with stalk or steering column mounted controls located adjacent to the steering wheel.

In another instance, the same user interface device may be used to select among the plurality of set-speeds. This may be accomplished by assigning a respective manipulation to each set speed. For example, assume that "resume" button $44_5$ is the user interface device configured for selecting set-speeds. One press of button $44_5$ may correspond to a first set-speed, two presses may correspond to a second, and three presses may correspond to a third set-speed. Accordingly, if the second set-speed is desired, the user would press button $44_5$ twice. Additionally or alternatively, the "resume" button $44_5$ may be used to select the last used set-speed and subsequent presses of the "+" and "−" buttons may be arranged to toggle up and down through a plurality of set-speeds stored in the memory 22.

It will be appreciated that examples of selecting a set-speed other than those described above may certainly be suitable, such as, for example, using one or both of the brake and accelerator pedals in the same or similar manner described above, and therefore, the present disclosure is not limited to any one particular technique. It will be further appreciated that in an instance wherein the same user interface devices are used to both define set-speeds and select desired predefined set-speeds, certain action will be required to allow the speed control system to differentiate between those two functions. Accordingly, a mode selector of some sort may be utilized to switch between a "definition" mode and a "selection" mode.

In an embodiment wherein the user is able to select or indicate a desired set-speed, method 100 may further comprise a step (not shown) of displaying the plurality of predefined set-speeds from which a selection may be made on a suitable user interface device that is in close proximity to the user (e.g., near the steering wheel). The predefined set-speeds may be displayed in a number of ways, in one embodiment, the set-speeds may be displayed in list form a display device that may comprise or be part of the user interface device used to select the desired speed (e.g., a touch screen), or that is separate and distinct therefrom. In another embodiment, each of the plurality of predefined set-speeds may represented by an illuminated marker or chaplet on or near the speedometer of the vehicle, or in another suitable manner. More particularly, each marker may be disposed at a location on or near the speedometer that corresponds to the set-speed that the marker represents. For example, if a first marker represents a set-speed of 5 mph (approximately 8 kph), that marker may be located in close proximity to the position on the speedometer corresponding to 5 mph (8 kph). If a second marker corresponds to a set-speed of 10 mph (approximately 16 kph), that marker may be located near the position on the speedometer corresponding to 10 mph (16 kph). In another embodiment, the numbers on the speedometer corresponding to the predefined set-speeds may be illuminated in way that distinguishes them from the other numbers. In either instance, the marker corresponding to the particular set-speed at which the vehicle is currently operating may be different in appearance from the others so as to allow for the user to distinguish between selected and non-selected set-speeds. For example, the marker corresponding, to the selected set-speed may be different in color, brightness, or size from the others. Alternatively, the marker corresponding to the current set-speed may be displayed in solid form, while the others may be in outline form. It will be appreciated that any number of techniques or schemes may be used to display the plurality of predefined set-speeds from which a desired set-speed may be selected, including, but not limited to those described above, and that the present disclosure is not limited to anyone technique or scheme. In one embodiment, VCU 16, or another suitable component of vehicle 10, along with a suitable user interface device 44, are configured to perform this step.

In another embodiment, in addition to or instead of allowing the user to manually select a desired set-speed from a plurality of predefined set-speeds, step 102 may comprise the speed control system automatically selecting the desired set-speed. More particularly, in some embodiments, step 102 may comprise automatically selecting a desired set-speed based on one or more predetermined conditions relating to the vehicle. One such condition may relate to the terrain over which the vehicle is traveling, and step 102 may comprise automatically selecting a new set-speed when it is determined that the vehicle has transitioned to a terrain or a characteristic of the terrain that is either not associated with the current set-speed or for which the current set-speed is inappropriate or less than optimal. In one embodiment this may comprise acquiring or determining terrain-related information in the same or similar manner described above, for example, and then utilizing a data structure (e.g., look-up table) correlating terrain with set-speeds, or some other terrain/set-speed profile, to determine one or more set-speeds that are associated with that terrain. A comparator or another known technique may then be used to compare the current set-speed with that associated with the new terrain to determine if a change is needed, and if it is, to select the appropriate new set-speed. In other embodiments, other conditions may be used in conjunction with or independently of those described above, and may include, for example and without limitation, those relating to: a particular mode (e.g., terrain mode) the vehicle is currently operating in; factors or conditions relating to vehicle composure, such as, for example, lateral and vertical acceleration of the vehicle, gear ratio of the vehicle driveline (e.g., transmission or PTU), ride height, wheel articulation, and vehicle seat occupancy. Accordingly, it will be appreciated that any number or combination of conditions/factors may be evaluated and used in step 102, each of which remains within the spirit and scope of the present disclosure. In one embodiment, the above described functionality may be performed by VCU 16 or another suitable component of the vehicle.

In yet another embodiment, step 102 may comprise a combination of the set-speed selection means described above. More particularly, a recommended set-speed from the plurality of predefined set-speeds based on one or more conditions, such as, for example, terrain, vehicle composure, etc. may be identified automatically by the speed control system in the same or substantially the same manner described above. The user may then be advised that the identified set-speed may be appropriate based on the existing circumstances, and may provide the user the opportunity to select the recommended speed using, for example, an appropriately configured user interface device (e.g., pushbuttons, touch screen, etc). In one embodiment, this functionality may be performed by VCU 16 in conjunction with an appropriately configured user interface device 44.

Once the desired set-speed is selected in step 102, method 100 may proceed to a step 104 of causing the vehicle to operate in accordance with the selected set-speed, and may also comprise doing so in accordance with a given acceleration corridor (e.g., 0.1-0.2 g). In one embodiment, this may comprise generating one or more electrical signals representative of the selected set-speed and communicating those signals to the appropriate vehicle subsystem (e.g., powertrain subsystem $12_1$, brake subsystem $12_3$, etc.) to indirectly effect the speed change. In another embodiment, and depending on the particular implementation, step 104 may comprise directly effecting the speed change. In either case, a message may be provided to the user prior to or during the adjustment in the speed of the vehicle to notify the user that the vehicle will be slowing down or speeding up so as to not alarm the user and/or cause the user to override the system unnecessarily, for example. In one embodiment, step 104 is performed by VCU 16 or another suitable component.

In certain embodiments, method 100 further comprise one or more additional steps that may or may not be optional, depending at least in part on the particular implementation of the method. For example, method 100 may further comprise a step 106 of determining whether the selected set-speed is appropriate in view of one or more conditions relating to the vehicle (e.g., determining whether the selected set-speed is too fast/slow in view of the evaluated conditions, and/or whether it will adversely affect vehicle composure, occupant comfort, etc.). In such an embodiment step 104 of causing the vehicle to operate in accordance with the selected set-speed may be performed only if the set-speed is determined to be appropriate in step 108. Additionally, in one embodiment, VCU 16 and/or VCU 16 in conjunction with an appropriately configured user interlace 44, or any other suitable component, may be configured to perform step 108.

Step 106 may be performed in a number of ways. For instance, in an embodiment wherein some or all of the predefined set-speeds are associated with particular types of terrain, one criterion that may be evaluated relates to the terrain over which the vehicle is traveling when the set-speed is selected. More particularly, in one embodiment, the criterion that must be met in order for the selected set-speed to be deemed appropriate is that the selected set-speed corresponds to, or is associated with, the current terrain. Accordingly, in such an embodiment, step 106 may comprise determining the type, classification, or nature of the terrain (which may also include characteristics of the particular terrain—e.g., roughness—in addition to the particular type) over which the vehicle is traveling, using, for example, the techniques described above or another suitable technique, and then determining if the selected set-speed is associated with that particular terrain. As described elsewhere herein, this determination may be made using, for example, a suitable data structure configured to correlate terrain with predefined set-speeds or some other terrain/set-speed profile. More particularly, in one example, the selected set-speed may be retrieved from a look-up table to see if it corresponds with the prevailing terrain. In another example, the selected set-speed may be compared with each pre-defined set-speed or set-speed range associated with the prevailing terrain using, for example, a comparator. Accordingly, it will be appreciated that any suitable technique may be used to perform this functionality and that the present disclosure is not limited to any one or more particular techniques. In any event, once it is determined if the set-speed is associated with the terrain, the further determination as to whether the selected set-speed is appropriate may also be made. In other words, if the selected set-speed does not correspond to the terrain, it will determined that it is not appropriate; while if the selected set-speed does correspond to the terrain. It will be determined to be appropriate.

Another criterion that may be evaluated in addition to or instead of that relating to terrain relates to the configuration of the vehicle. More particularly, in one embodiment, the criterion that must be met in order for the selected set-speed to be deemed appropriate is that certain vehicle subsystems 12, and certain parameters thereof, in particular, are appropriately configured to traverse the prevailing terrain at the desired set-speed.

More particularly, the speed control system (e.g., VCU 16) may be further configured to monitor and evaluate the configuration of the vehicle (e.g., one or more vehicle parameters or features relating to vehicle configuration) to determine whether a selected set-speed is appropriate for the vehicle in view of its current configuration and the terrain over which the vehicle is traveling. In one embodiment, if it is determined that the vehicle is not appropriately configured, the speed control system may be configured to cause corrective measures to be taken, if possible. More particularly, the speed control system may monitor the status or current state of certain vehicle subsystems or components/parameters/features of the vehicle that may have a bearing on, for example, off-road capability, ride-ability, vehicle composure, etc., and those subsystems may include, for example, those controlling parameters such as ride height, tyre pressure, and HI-LO ratio setting, to cite a few possibilities.

In some embodiments, information relating to the subsystems and/or the relevant parameters may be received or acquired by the speed control system from one or more of the plurality of vehicle sensors 14 and/or various vehicle subsystems 12 themselves, for example. For instance, in the case where ride height is a parameter that is being monitored, readings or signals from air suspension sensors may be acquired from the ECU of the appropriate subsystem (e.g., chassis management subsystem $12_2$), or from one or more sensors themselves. Once the necessary information has been acquired, it may be evaluated along with the current or selected desired set-speed, as well as information relating to the terrain, to determine if the vehicle is properly configured to traverse the terrain at the desired set-speed. This evaluation may be performed in a number of ways. For example, the information relating to each parameter being evaluated may be compared to respective predetermined criteria to assess whether that particular parameter is acceptably configured for the desired set-speed and the given terrain. This may be done, for example, by utilizing a suitable data structure that correlates the parameter, terrain, and set-speed together. Alternatively, a previously established parameter/terrain/set-speed profile may be used to make the necessary determination, some form of comparator, or any number of other suitable techniques known in the art may be utilized. For instance, in one example, the configuration may be retrieved from a look-up table to determine if it corresponds with the selected set-speed and the prevailing terrain. In another example, the selected set-speed may be retrieved from a look-up table to determine what the appropriate configuration of the vehicle should for that set-speed and the prevailing terrain. Each parameter of the current configuration may then be compared with the appropriate "pre-determined" parameter using, for example, a comparator, to determine whether it is acceptable in its current state. It will be appreciated that any suitable technique may be used to perform this functionality and that the present disclosure is not limited to any one or more particular techniques.

Accordingly, in such an embodiment, step 106 may comprise determining the state or status of one or more subsystems 12 or parameters thereof, using, for example, the techniques described above and that are well known in the art, and then determining if, at the desired set-speed, that particular subsystem or parameter is appropriately or optimally configured to traverse the prevailing terrain. This determination may be made in a number of ways such as, for example, those described above. Once a determination is made for each parameter being evaluated, the further determination as to whether the selected set-speed is appropriate may also be made. In other words, if a given number or particular elements of the evaluated vehicle configuration parameters are not appropriately or optimally configured, it will determined that the set-speed is not appropriate, and in certain embodiments, such as those described below, corrective measures may be taken. On the other hand, if all or, in another embodiments, al feast a given number or particular elements of the parameters are appropriately configured, it will be determined that the selected set-speed is be appropriate.

It will be appreciated that while only certain criteria for determining whether a selected set-speed is appropriate have been described in detail above, other conditions and criteria may certainly be used, including, for example, those relating to particular modes in which the vehicle is operating (e.g., terrain modes), the composure of the vehicle, etc. Accordingly, the present disclosure is not limited to the use of any particular criteria or conditions.

Figure 6:
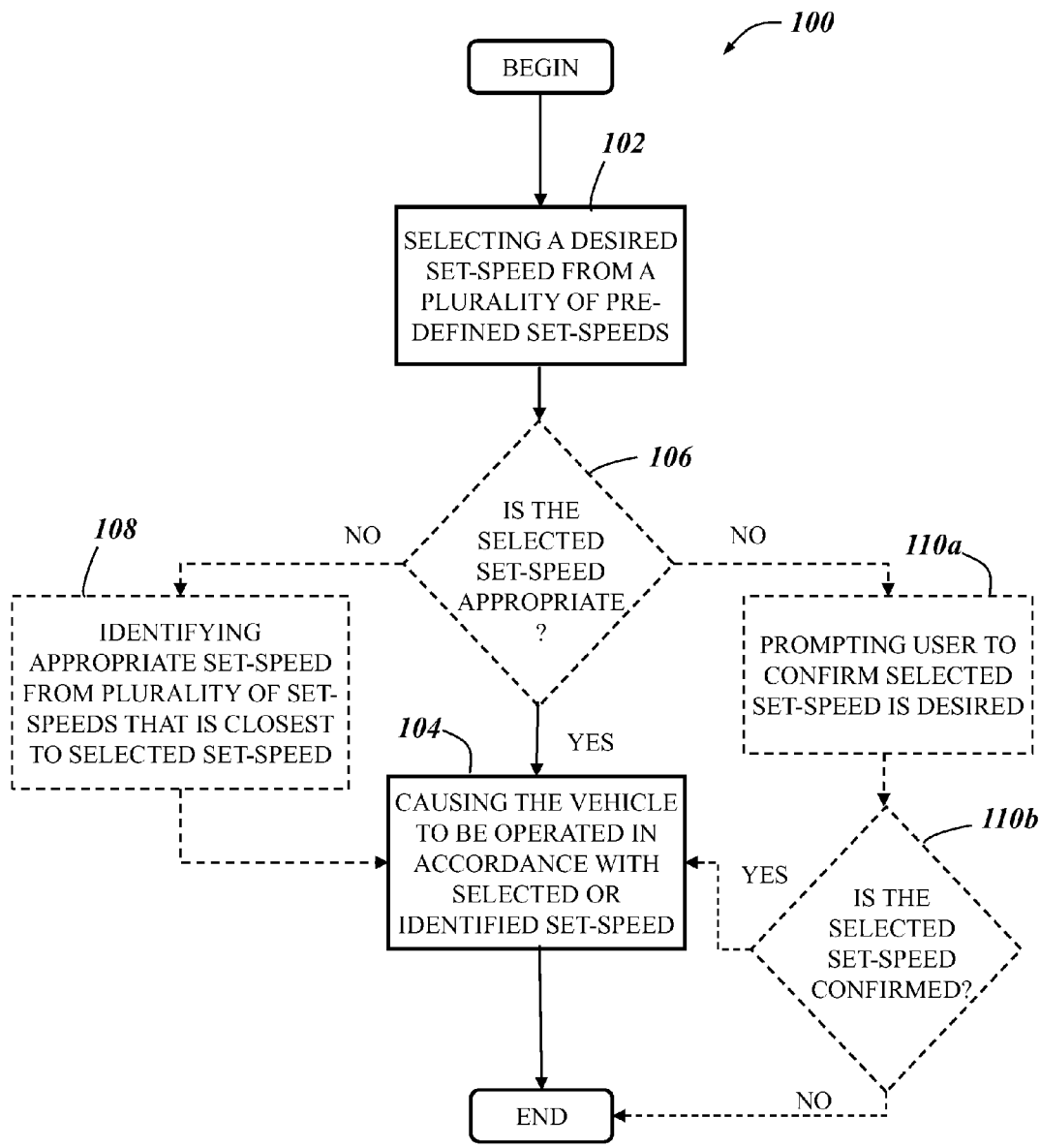

As illustrated in FIG. 5, if it is determined that the selected set-speed is appropriate, method 100 may proceed to step 104 and the vehicle will be commanded to operate at the selected set-speed. In such an instance, the selected set-speed will be maintained for as long as it remains appropriate in view of the predetermined criteria used to make such a determination. If, however, the selected set-speed is deemed not to be appropriate, one of any number of things may happen. For example, method 100 may simply end and the set-speed of the vehicle will remain at the current set-speed. In such an embodiment, the user may be notified (e.g., via an audible or visual message through one or more user interface devices) that the selected set-speed was deemed to be inappropriate; alternatively, no notification may be provided. However, in other embodiments, such as, for example, those illustrated in FIG. 6, one or more affirmative steps may be taken.

More, particularly, and with reference to FIG. 8, in one embodiment, method 100 may further comprise a step 108 of identifying an alternative set-speed from the plurality of predefined set-speeds that is both appropriate in view of the evaluated criteria and that is closest to the selected set-speed, and then causing the vehicle to operate in accordance with that identified set-speed in step 104. This step may be performed in the same manner described above with respect to automatically selecting set-speeds in step 102 and determining the appropriateness of a selected set-speed in step 106, and therefore, the description above will not be repeated but rather is incorporated by reference. In addition to identifying an alternate set-speed, step 108 may also comprise a substep of recommending the identified set-speed to the user (via, for example, a suitably configured user interface device) and allowing the user to select if it is acceptable, in any event, in one embodiment, step 108 may be performed by VCU 16 and/or VCU 16 in conjunction with a user interface device 44, or another suitable component.

Rather than identifying an alternate set-speed following the determination that a selected set-speed is inappropriate, in another embodiment, method 100 comprises an alternative step 110 of prompting (step 110a) the user to confirm that the selected set-speed is actually desired. In one embodiment, this step may comprise generating a message that may be displayed audibly and/or visually on an appropriately configured user interface device in close proximity to the user. In response, the user may either confirm or cancel the selected set-speed by utilizing the same or a different user interface device (e.g., one or more of user interface device(s) 44). If it is determined (step 110b) that the user has confirmed the selected set-speed is, in fact, desired, the method may proceed to step 104 of causing the vehicle to operate in accordance with the selected set-speed; if not, method 100 may end. In one embodiment, step 110 may be performed by VCU 16 and/or VCU 16 in conjunction with one or more user interface devices 44, or another suitable component.

In still another embodiment, method 100 may include a step (not shown) of monitoring the one or more criteria or conditions used to determine if the selected set-speed is appropriate. In such an embodiment, once it is determined that the selected set-speed has become appropriate, method 100 may proceed to step 104 of causing the vehicle to operate in accordance with the selected set-speed. This step may further include the intervening sub-steps of gradually accelerating/decelerating the vehicle towards the selected set-speed as the conditions/criteria permit, and doing so in accordance with a predetermined acceleration corridor (e.g., 0.1-0.2 g). This step may be performed in the same manner as step 106 described above, and, in one embodiment, may be done so by VCU 16 or another suitable component.

Finally, in the specific embodiment described above wherein the criteria utilized to determine whether the selected set-speed is appropriate relates to the configuration of the vehicle, in certain embodiments. It may be possible to make the necessary adjustments to one or more vehicle parameters or subsystems to render the vehicle appropriately or optimally configured for the selected set-speed, and therefore, to render selected set-speed appropriate. In one such embodiment, the vehicle may be slowed down to a reduced speed, or stopped altogether. In one embodiment, the necessary changes may be automatically made, while in other embodiments, some or all of the adjustments must be made or commanded by the user. In the first instance, the speed control system (e.g., VCU 16), or another suitable component, may be configured to indirectly command that the requisite adjustments be made by sending command signals to the appropriate vehicle subsystems (e.g., driveline subsystem $12_4$ for HI-LO ratio, chassis management system $12_2$ for ride height, etc.), or may effect the changes itself, if applicable. In the latter instance, the VCU 16, or another suitable component, may advise the user of the required/recommended adjustments, and may allow the user to make the adjustments (i.e., command that they be made) or to select a different, more appropriate set-speed. In any event, if it is confirmed that the necessary adjustments have been made, the method may proceed to step 104 of causing the vehicle to operate in accordance with the selected set-speed. Alternatively, method 100 may end or may proceed to one of the other steps set forth above, such as, for example step 108 or step 110.

Figure 7:
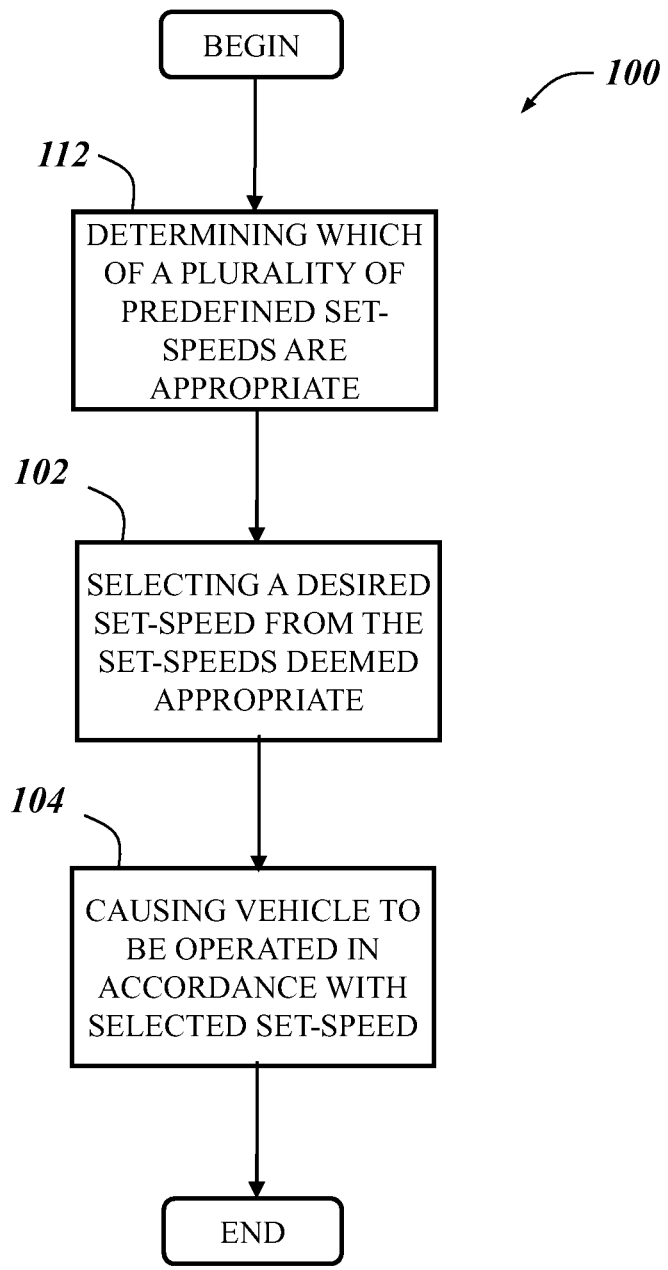

In another embodiment of method 100 such as, for example, that illustrated in FIG. 7, rather than evaluating the appropriateness of the desired set-speed following its selection in step 102, this functionality may be substantially performed in advance of selecting step 102. More particularly, in one embodiment, one or more predetermined conditions or criteria may be evaluated to determine, in a step 112, which of the plurality of predefined set-speeds are appropriate based on those evaluated conditions (e.g., which of the speeds are not too fast/slow in view of the evaluated conditions, and/or will not adversely affect vehicle composure or occupant comfort). In other words, the universe of the plurality of predefined set speeds from which a selection may be made may be reduced to only those set-speeds that are appropriate based on the evaluated conditions.

For example, if the predetermined conditions relate to terrain, and the vehicle is currently traveling over a terrain or surface such as snow, step 112 may comprise identifying all those predefined set-speeds that are associated with that surface or terrain, and allowing for the selection of a desired set-speed only from those identified set-speeds. Similarly, if the vehicle is operating in a particular mode, such as a particular terrain mode, step 112 may comprise identifying or grouping all those set-speeds that are associated with that terrain mode together and allowing for the selection of a desired set-speed only from those identified set-speeds. Accordingly, in such an instance, step 112 would comprise only displaying those set-speeds that correspond to or are associated with snow or the particular terrain mode, or trial are otherwise determined to be appropriate. In some embodiments, this step may be performed utilizing a data structure that correlates the characteristics to which the evaluated conditions pertain or relate (e.g., terrain type, roughness, etc.) and the predefined set-speeds. Alternatively, some other previously-determined terrain/set-speed profile that may be empirically derived during manufacture or during vehicle operation may be used, or any other suitable method known in the art. In any instance, once step 112 is performed, and therefore, the plurality of predefined set-speeds from which a desired set-speed may be selected has been defined (which may include ail or a subset of the stored predefined set-speeds), method 100 may proceed as described above from step 102, and may or may not, depending on the particular implementation, require that one or more of steps 106, 108, 110 described above with respect to FIG. 6 (i.e., determining if the selected set-speed is appropriate and the steps following thereafter when the set-speed is not appropriate) be performed. Accordingly, step 112 comprises creating certain groups or subsets of the plurality of predefined set-speeds in order to improve efficiency and performance.

It will be appreciated that while only certain criteria/conditions have been discussed with respect to performing step 112, any number of other conditions, including, for example, those described with respect to other steps of method 100, may be used in combination with or independently from those described above. Accordingly, the present disclosure is not limited to any particular criteria or conditions. In any event, in one embodiment, step 112 may be performed by VCU 16 or another suitable component.

Accordingly, it will be appreciated in view of the above that a benefit of the present system and method, among others, is that unlike conventional speed control systems wherein a set-speed may be adjusted only in discrete and predetermined equal increments (e.g., 1 mph or 1 kph), the present system and method are not so limited. More particularly, in conventional systems, if the change between a current and a desired set-speed is greater than the increment value, the set-speed cannot jump directly to the desired set-speed, but rather it must be incrementally adjusted through each of the intervening speeds. In the present system and method, however, a plurality of set-speeds may be defined that need not be equally distributed or separated by equal increments, and as a result, the set-speed does not need to be adjusted incrementally and a change from one to another set-speed may be performed directly, regardless of the difference in the set-speeds. For example, to increase the set-speed from Xmph/kpb to X+3 mph/kph in conventional speed control systems, the system must pass through each of the other two intervening speeds (e.g., (X+1 mph/kph and X+2 mph/kph) before it gets to X+3 mph/kph, which may entail three (3) separate commands (in the instance where the set-speed may be adjusted in 1 mph (or 1 kph) increments), or one prolonged command performed until the desired set-speed is reached. In the present method and system, however, set-speeds of Xmph/kpb and X+3 mph/kph, and X+7 mph/kph may be set as predefined set-speeds and so the set-speed may be changed from X to X+3 mph/kph directly, in an embodiment, by a single command and without having to pass through the intervening speeds. Similarly, a set-speed of X may also be changed to X+7 mph/kph directly, in an embodiment, by a single command and without having to pass through the intervening speeds. As a result, the task of adjusting the set-speed in the present system and method may prove to be less burdensome and distracting to the user who, in most instances, would be driving the vehicle while also adjusting the set-speed, than is the case in conventional speed control systems.

It will be understood that the embodiments described above are given by way of example only and are not intended to limit the invention, the scope of which is defined in the appended claims. The invention is not limited to the particular embodiments) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:
1. A method for controlling the speed of a vehicle, comprising:

providing a memory device configured to store a plurality of predefined set-speeds therein, including a group of predefined and discrete set-speeds for each of a plurality of different types of terrain, each group representing a subset of the plurality of predefined set-speeds;

evaluating with an electronic control unit one or more conditions relating to the type of terrain over which the vehicle is traveling to select one of the predefined set-speed groups in view of the evaluated condition(s);

selecting a desired set-speed only from the selected group of predefined and discrete set-speeds stored in the memory device; and causing the vehicle to operate in accordance with the selected set-speed.

2. The method of claim 1, wherein the selecting step comprises one of:

receiving a user input corresponding to the selected set-speed; and automatically selecting the desired set-speed based on one or more predetermined conditions relating to the vehicle.

3. The method of claim 1, further comprising displaying the plurality of predefined set-speeds on a display device.

4. The method of claim 1, further comprising:

defining a set-speed during operation of the vehicle; and storing the defined set-speed in a data structure of the memory device as one of the plurality of predefined set-speeds.

5. The method of claim 1, wherein when it is determined that the selected set-speed is not appropriate, the method further comprises automatically:

identifying an appropriate set-speed from the plurality of predefined set-speeds that is closest to the selected set-speed; and causing the vehicle to operate in accordance with the identified set-speed.

6. The method of claim 1, further comprising automatically determining the particular type of terrain over which the vehicle is traveling and then determining if the speed is appropriate for that particular type of terrain.

7. The method of claim 1, further comprising:

when it is determined that the selected set-speed is not appropriate, prompting the user to confirm that the selected set-speed is desired; and causing the vehicle to operate in accordance with the selected set-speed only when a user input is received confirming that the selected set-speed is desired.

8. A method for controlling the speed of a vehicle, comprising:

providing a memory device configured to store a plurality of predefined set-speeds therein, including a group of predefined and discrete set-speeds for each of a plurality of different types of terrain, each group representing a subset of the plurality of predefined set-speeds;

evaluating one or more conditions relating to the vehicle to select one of the predefined set-speed groups in view of the evaluated condition(s);

selecting a desired set-speed only from the selected group of predefined and discrete set-speeds; and causing the vehicle to operate in accordance with the selected set-speed.

9. The method of claim 8, wherein the one or more predetermined conditions relate to the type of terrain over which the vehicle is traveling, and further wherein:

the evaluating step comprises evaluating the particular type of terrain over which the vehicle is traveling; and the selecting step comprises selecting a desired set-speed only from those set-speeds of the plurality of defined set-speeds that are appropriate for that particular type of terrain.

10. The method of claim 8, wherein the selecting step comprises one of:

receiving a user input corresponding to the selected set-speed; and automatically selecting the desired set-speed based on one or more conditions relating to the vehicle.

11. The method of claim 8, further comprising determining whether the selected set-speed is appropriate based on one or more criteria relating to the vehicle, and causing the vehicle to operate in accordance with the selected set-speed only when the selected set-speed is appropriate.

12. A vehicle comprising a system for controlling the speed of a vehicle, comprising:

a memory device configured to store a plurality of predefined set-speeds therein, including a group of predefined and discrete set-speeds for each of a plurality of different types of terrain, each group representing a subset of the plurality of predefined set-speeds;

and an electronic control unit, the electronic control unit configured to:

evaluate one or more conditions relating to the type of terrain over which the vehicle is traveling to select one of the predefined set-speed groups in view of the evaluated condition(s);

select a desired set-speed only from the selected group of predefined and discrete set-speeds stored in the memory device; and cause the vehicle to operate in accordance with the selected set-speed.

13. The system of claim 12, further comprising a user interface device configured to allow a user to select a desired set-speed from the plurality of predefined set-speeds stored in the memory device, wherein the electronic control unit is configured to select the desired set-speed in response to a user input received from the user interface device.

14. The system of claim 12, further comprising a display device, wherein the electronic control unit is configured to control the display device to display the plurality of predefined set-speeds thereon.

15. The system of claim 12, wherein the electronic control unit is configured to automatically select the desired set-speed based on one or more conditions relating to the vehicle.

16. The system of claim 12, wherein when it is determined that the selected set-speed is not appropriate, the electronic control unit is further configured to:

identify an appropriate set-speed from the plurality of set-speeds that is closest to the selected set-speed; and operate the vehicle in accordance with the identified set speed.

17. The system of claim 12, wherein the electronic control unit is further configured to:

determine the particular type of terrain over which the vehicle is traveling;

identify which of the plurality of predefined set-speeds are appropriate for that particular type of terrain; and select the desired set-speed only from those of the plurality of predefined set speeds that are appropriate for that particular type of terrain.

18. A vehicle comprising the system recited in claim 12.

* * * * *